UNITED STATES PATENT OFFICE.

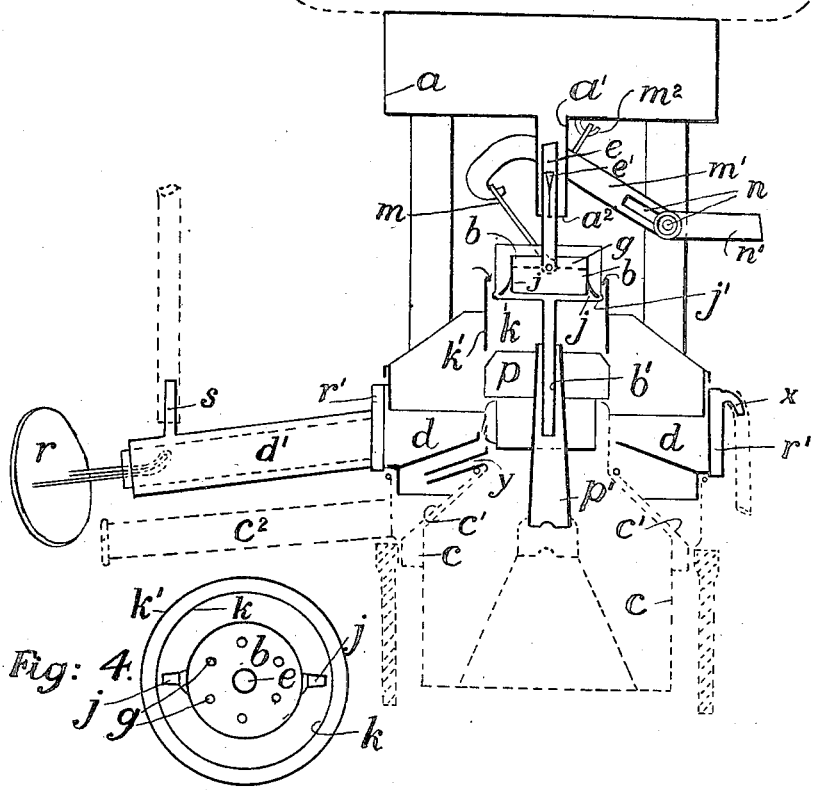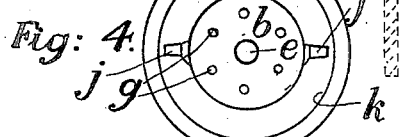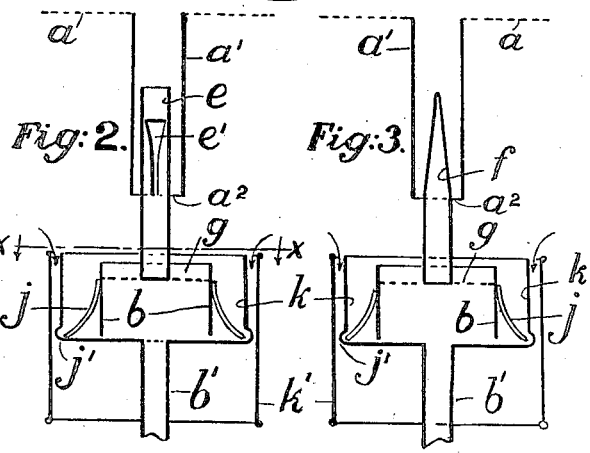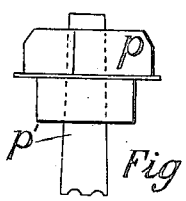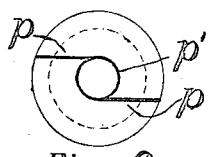

WILLIAM GORDON COOTE, OF EAST KATANNING, WESTERN AUSTRALIA, AUSTRALIA.

CREAM-SEPARATOR.

1,379,532.  Specification of Letters Patent.  Patented May 24, 1921.

Application filed January 7, 1920. Serial No. 350,053.

*To all whom it may concern:*

Be it known that I, WILLIAM GORDON COOTE, a subject of the King of Great Britain, and residing at East Katanning, Western Australia, Commonwealth of Australia, have invented certain new and useful Improvements in Cream-Separators, of which the following is a specification.

This invention relates to cream separators, and its object is to attain certain economic and commercial and other advantages in the working and use of said separators.

One of the chief advantages of this invention resides in effecting a perfect uniformity or regular and even density of cream at all speeds, that is either at a low, medium, or high speed. Furthermore, at all speeds and capacities all waste of cream is prevented, and the skimmed milk is discharged in an impoverished condition and destitute of cream, and irrespective of variation of type, speed or capacity of the separator, and which capacity may be increasable or decreasable as desired by the operator. To attain such result the feed supply of the milk is automatically governed and regulated in mutual agreement with the speed of the separator by means of an air suction device hereinafter described. The invention also comprises means whereby the cream is aerated, and animal or other objectionable odors, taints or flavors are removed and eliminated. The invention also further comprises means whereby the cream is cooled in its chamber by a cold water jacketed wall against which the cream is thrown or makes contact prior to its final exit. With these and other related objects in view my invention consists of the peculiar construction and operative combination of parts, and members and their novel combination and use will now be fully explained with the aid of the attached drawings wherein—

Figure 1 is a sectional elevation showing the application of my improvements to a cream separator, and in said view the existing parts of the separator are denoted by broken lines, also other parts thereof are removed for sake of clearness. Fig. 2 is an enlarged sectional elevation showing the automatic milk feed valve device in its normal position. Fig. 3 is a similar view showing a conical form of valve. Fig. 4 is a plan view on line $x-x$ of Fig. 2. Figs. 5 and 6 are respectively elevation and plan views of the air suction device.

Referring to said drawings $a$ is the ordinary float chamber positioned at the head of the separator, and from which the milk flows by gravity down through the outlet tube $a^1$ into the cup or receiver $b$ leading to the head of the lower pipe $b^1$ which latter directly feeds the milk into the usual rotating bowl $c$ in which the milk is centrifugally treated, and the cream separated therefrom in the well known manner—the skimmed milk passing out through chamber $c^1$ and spout $c^2$, while the cream passes out through chamber $d$ and spout $d^1$ in ordinary manner. In the outlet tube $a^1$ an inner tubular valve $e$ is adapted to telescope and vertically work, see Figs. 2 and 3—said valve tube $e$ is open at its top, and is made with the milk outlet port $e^1$ of a taper or graduated and curved shape, and section as shown and positioned and arranged in such manner that as the speed of the separator increases the area of exposure of said port $e^1$ will also increase therewith, and consequently allow of an increased volume of milk to flow into the separator bowl $c$. The annular outlet space between the tubes $a^1$ and $e$ is always open, while the port $e^1$ acts as an auxiliary outlet for the increased volume of milk—said port does not become operative until it comes in line with and below the bottom edge $a^2$ of the outer tube $a^1$. This valve tube $e$ at its closed bottom terminal is thereat connected with the inverted cup $g$ formed with the top inlet milk holes $g^1$, see Fig. 4—said cup is freely and removably held in position within the air operated piston $k$ by the outwardly directed spring legs $j$, which latter at their extremities engage within the retention bead or recess $j^1$ formed in the piston $k$ on the pipe $b^1$, and by said legs $j$ the valve $e$ is held in position during its functions and movements.

The object of having the port $e^1$ of a curved and graduated shape is to permit of the escape therethrough of a larger quantity of milk than would otherwise be permissible by the increased speed of the separator, as I have found in practice that the capacity and speed do not maintain a constant ratio or proportion with each other.

As seen in Fig. 3, the milk valve is made of a cone shape as $f$ and which shape permits of the easy cleaning of the valve, said cone may be either of a straight or curved form.

On the lower feed pipe $b^1$ is operatively carried an air piston $k$ working in its cylinder $k^1$, which latter is open at the top and bottom. This air piston $k$ by its movement causes the fall or rise of the thereon carried milk outlet valve $e$, and consequently exposes or closes the port $e^1$ governing the increased outlet of the milk. The minimum quantity of milk escapes through the always open annular space provided therefor between the tube $a^1$ and the tubular valve $e$, and it is apparent that upon the exposure or closure of said outlet port $e^1$, either below or above the bottom edge $a^2$ of the milk outlet tube $a^1$ it will consequently control and govern the supply of the milk over and above the minimum quantity above mentioned. The air piston $k$ is operatively connected by the forked link $m$ to an arm $m^1$ pivotally swung by hook $m^2$ to the underside of the float chamber $a$, said arm by slot and wing nut $n$ carries the adjustment weight $n^1$, and whereby the valve $e$ possesses a delicate and compensatory action and behavior. By means of said weight and arm the air piston $k$ is held at its normal or highest position as seen in the drawing, until the speed of the separator increases to such a degree as to enable and render the separator capable of treating a quantity of milk in excess of the minimum quantity. The initial means for governing the supply of milk consists of a fan bladed device $p$ which is removably secured by its tubular tapered hub or stem $p^1$ to the rotatable bowl $c$ or other rotatable member of the separator. The object of tapering the tubular stem $p^1$ is to provide an inclined wall to compel the down flow of any milk which may be thrown against same from the tube $b^1$. This fan $p$ acts as the air feed agent for working the piston $k$, and also for aerating the cream. The air to the fan $p$ passes downwardly around the air piston and into the cream chamber $d$, and finally out through said chamber $d$ and spout $d^1$, and by and during its travel it aerates and purifies the cream and frees it from all objectionable odors or taints. The peripheral space around the air piston $k$ is determined upon in order to provide sufficient air feed space for the rotation of the fan $p$, and when such air feed becomes insufficient owing to the increased speed of the fan and separator the piston $k$ is caused to descend, and thereby open the milk outlet port $e^1$. On the exit mouth of the cream spout $d^1$ is adjustably fitted the baffle plate $r$ whose purpose is to baffle any portion of the cream which would otherwise escape in the form of spray, owing to the air blast from the fan $p$.

The cream chamber $d$ and its spout $d^1$ as shown in Fig. 1, are made of a double walled or jacketed construction as $r^1$ into which hollow space thereby provided the cooling water is fed from any suitable high level source through inlet pipe $s$, and passing out through the overflow pipe $x$, thereby maintaining a complete circulation of cooling water to said cream chamber $d$ and its spout $d^1$.

A further structural feature of my invention resides in the provision made for the outlet of the skimmed milk from the bowl $c$—said outlet being positioned on a peripheral line with that of said bowl by means of an extension tube $y$ attached thereto, see Fig. 1. It is obvious that the mouth of said tube $y$ rotates at the same peripheral speed as that of the maximum diameter of the bowl $c$, with the result that there is no retardation of the outlet of the skimmed milk therefrom, which at present occurs with bowls of existing formations.

What I claim as my invention and desire to secure by Letters Patent is:—

In cream separators, the combination with the cream chamber and an outlet spout connected thereto, of means for cooling said chamber and spout consisting of an outer jacketed wall surrounding said chamber and spout, an inlet pipe for connecting a high level water source to said jacket, and an outlet pipe connected to the jacket, whereby a constant flow of cooling water about the cream chamber and spout is maintained.

In testimony whereof I have hereunto set my hand in presence of two subscribing witnesses.

WILLIAM GORDON COOTE.

Witnesses:
BEATRICE HORSBURGH,
REGINALD OVERINGTON.